April 7, 1970 H. E. GODDARD 3,505,052
MACHINE FOR MAKING WIRED GLASS
Filed July 19, 1968 4 Sheets-Sheet 1

INVENTOR.
HERMAN E. GODDARD
BY
Pennie, Edmonds, Morton, Taylor + Adams
ATTORNEYS April 7, 1970      H. E. GODDARD      3,505,052
MACHINE FOR MAKING WIRED GLASS
Filed July 19, 1968      4 Sheets-Sheet 2
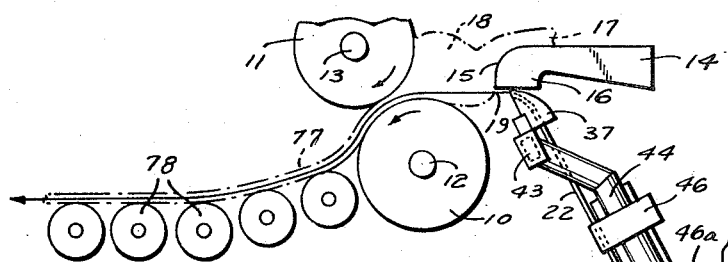
FIG. 2
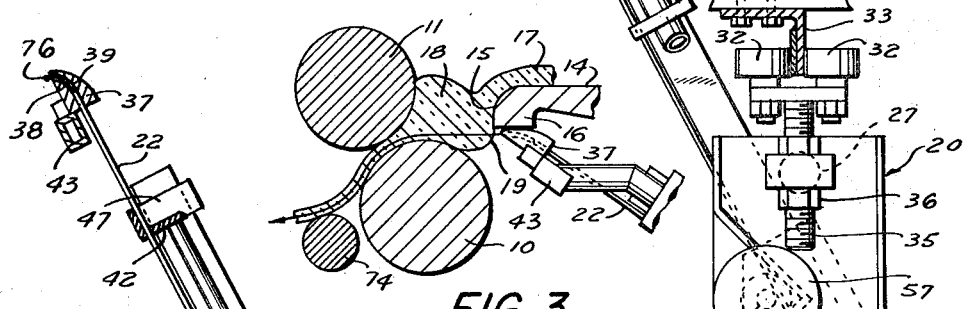
FIG. 3
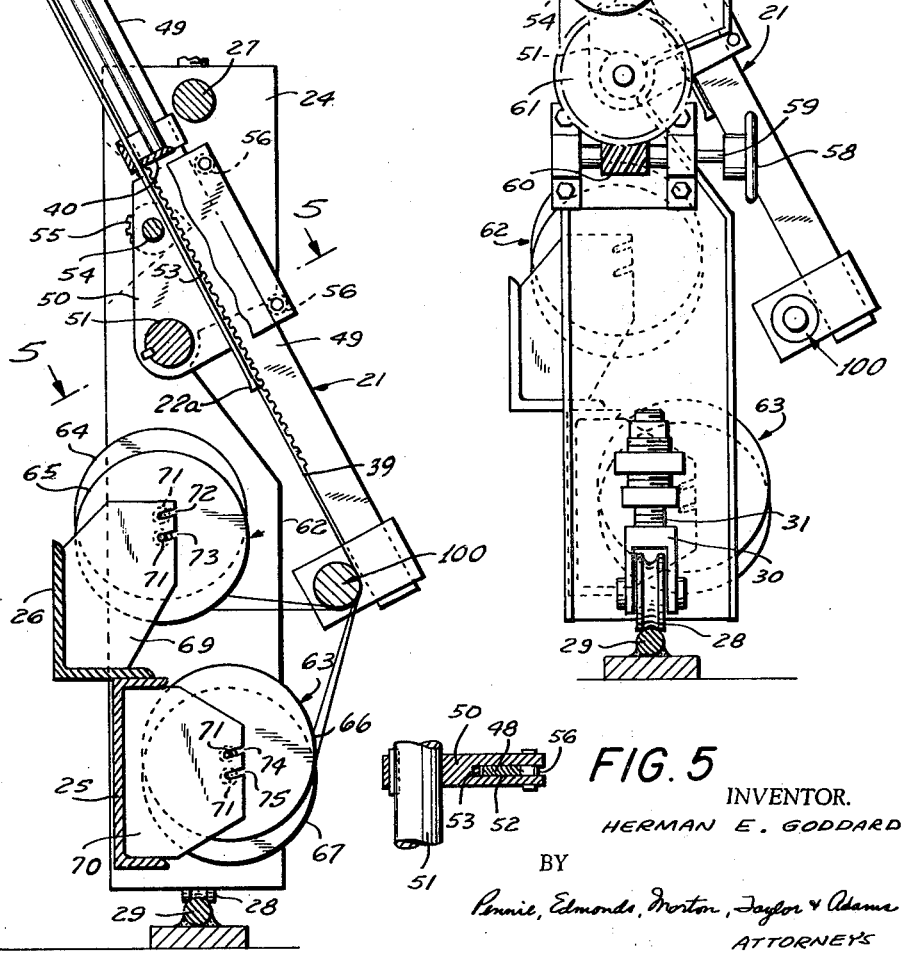
FIG. 4
FIG. 5
INVENTOR.
HERMAN E. GODDARD
BY
Pennie, Edmonds, Morton, Taylor & Adams
ATTORNEYS April 7, 1970  H. E. GODDARD  3,505,052
MACHINE FOR MAKING WIRED GLASS
Filed July 19, 1968  4 Sheets-Sheet 3

INVENTOR
HERMAN E. GODDARD
BY
Pennie, Edmonds, Morton, Taylor & Adams
ATTORNEYS

April 7, 1970  H. E. GODDARD  3,505,052
MACHINE FOR MAKING WIRED GLASS
Filed July 19, 1968  4 Sheets-Sheet 4
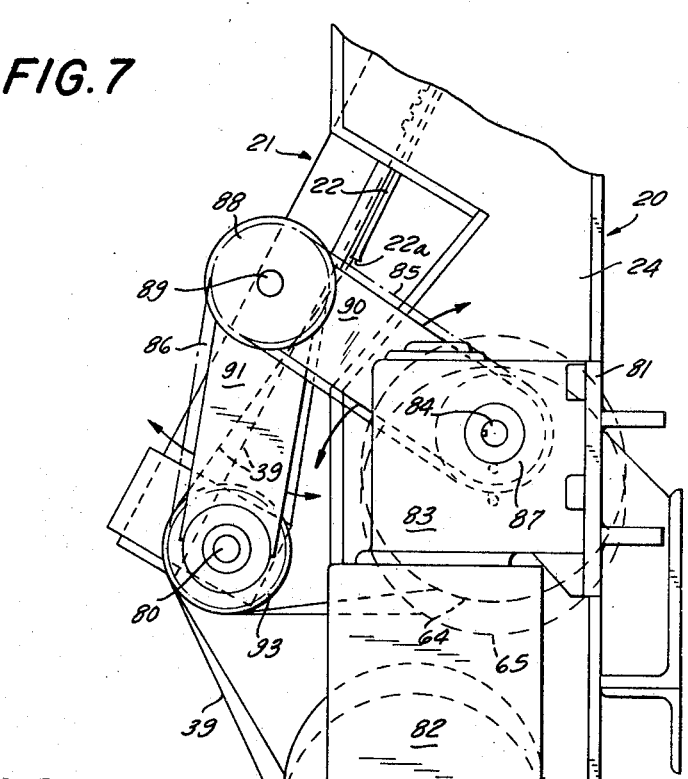
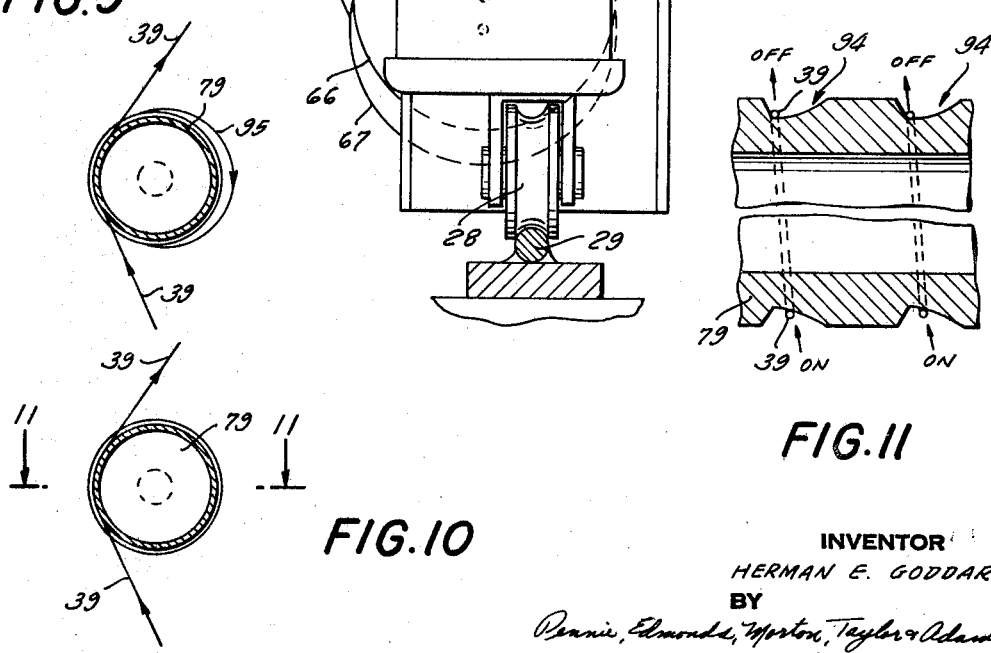
INVENTOR
HERMAN E. GODDARD
BY
Pennie, Edmonds, Morton, Taylor & Adams
ATTORNEYS United States Patent Office 3,505,052
Patented Apr. 7, 1970

3,505,052
MACHINE FOR MAKING WIRED GLASS
Herman E. Goddard, Greeneville, Tenn., assignor to American Saint Gobain Corporation, Kingsport, Tenn., a corporation of Delaware
Continuation-in-part of application Ser. No. 508,716, Nov. 19, 1965. This application July 19, 1968, Ser. No. 751,669
Int. Cl. C03b 13/12
U.S. Cl. 65—148
6 Claims

ABSTRACT OF THE DISCLOSURE

Closely spaced parallel unjoined wire strands are embedded in the molten glass as it advances from a forehearth to the forming rolls. The forehearth is disposed at about the level of the axis of the upper roll and the end of the forehearth is spaced laterally a greater distance from the axis of the upper roll than from the axis of the lower roll. The end of the forehearth is spaced laterally from the surface of the upper roll by approximately one half the diameter of the lower roll so that the thickness of the molten glass resting on the lower roll, and cooled somewhat thereby, and through which the unjoined wires are fed is approximately one half the diameter of the lower roll. Thus the wires enter the molten glass mass above the side of the lower roll where the heat is not intense, the wires being fed through the guide tubes from the supply reels below. A supply reel is provided for each of the wires, and the wire from this reel is fed into the lower end of its tube by a feed roll containing a series of grooves, one groove for each wire, and the wire is wound at least one turn around the feed roll.

CROSS-REFERENCE TO RELATED APPLICATION

This application is a continuation-in-part of my co-pending application of the same title, Ser. No. 508,716 filed Nov. 19, 1965, now abandoned.

BACKGROUND OF THE INVENTION

It has heretofore been found difficult to imbed wire strands in a glass sheet, particularly when a large number of wire strands are arranged as close to one another as ½ inch. Great difficulty has been experienced in feeding the wire strands in such a way as to prevent tangling and maintain control of the great number of wires that are necessary to produce the desired product. For example, a conventional glass rolling machine may produce a sheet which is 60 inches in width. This requires the feeding of 120 wires spaced on ½ inch centers, and it is important that the wires be fed into the glass sheet as it is formed and midway between the upper and lower surfaces of the sheet which may have a thickness of 7/32 of an inch.

An object of the present invention is to provide a machine for producing a glass sheet of this type in which a great number of closely placed wires or strands are accurately spaced, parallel to one another, and which will feed the wires without snagging or tangling, and control the wire tension required to imbed the wires at the proper or desired uniform depth in the molten glass.

Another object of the invention is to overcome a special problem which is inherent in the prior art apparatus in which reinforcing wires have been introduced into the molten glass from a position above the forming rolls. The molten glass is at a high temperature and the forming rolls themselves are also hot and when the reinforcing wires are fed from above they are subjected to a high temperature which produces a tendency for the wires to oxidize and leads to the use of specially prepared and expensive reinforcing material.

Description of the prior art

U.S. Patent No. 2,291,549, Gutmann and No. 3,207,591, Pfluger are examples of the prior art where the above mentioned problem of overheating the reinforcing material occurs.

In the Gutmann patent the forming rolls are mounted on axes which are located in a horizontal plane. The molten glass flows onto the upper surface of one of these rolls, and the reinforcing material, which in this case is wire mesh, is fed downwardly in a vertical direction into the molten glass.

In the Pfluger patent the forming rolls are arranged vertically one above the other and the molten glass flows horizontally between them. The reinforcing wires, while not entering the molten glass in a vertical direction as in Gutmann, nevertheless enter the molten mass from above, in this case above the flowing mass of molten glass approaching the forming rolls from the batch vat over the parts 13 and 14. These wires are thus subjected to intense heat, and in order to overcome this difficulty resort is had to a cooling device 1 which involves the use of a circulating liquid cooling medium.

The present invention overcomes the problems presented in the prior art as exemplified by these patents in a simple, effective and inexpensive way.

SUMMARY OF THE INVENTION

In accordance with the invention two co-operating forming rolls are provided having a forehearth arranged in advance thereof, and molten glass is delivered over the forehearth to the forming rolls. The forehearth has a delivery edge which turns downwardly and includes a lip block, these parts being spaced sufficiently from the forming rolls to cause the movement of the molten glass to form a mass at the entrance to the rolls which has an apron drooping from the lip block. The wire-feeding apparatus or devices is arranged to direct the wires through appropriately spaced guide tubes into this apron which is beneath the hot glass being fed to the forming rolls.

The wires thus entering the hot glass mass from below are in a comparatively cool position and not subjected to the extremely high temperature to which wires are subjected when fed from above into the hot glass. Consequently less oxidation occurs, and this permits the use of less expensive mild steel wire rather than wire made of stainless steel, or chrome-plated steel such as is required to be used with top feed machines.

The guide tubes are carried by a support or carrier which is pivotally mounted on a main frame and this frame is mounted for lateral adjustment with respect to the forming rolls. By means of this adjustment and by angular adjustment of the guide tube support, the wires are made to approach the forming rolls in a nearly vertical direction and are delivered at the proper elevation beneath the lip block so that they will be drawn into the molten glass in a nearly horizontal direction. Supply reels are provided from which the wires pass into the lower ends of the guide tubes, advantageously being drawn from the supply reels by a feed roll which is positively driven.

BRIEF DESCRIPTION OF THE DRAWINGS

The invention will be better understood from a consideration of the following detailed description in connection with the accompanying drawings. In these drawings:

FIG. 2 is an end view looking from the left of FIG. 1 as shown by the arrows 2—2;

FIG. 3 is drawn to a larger scale and is a fragmentary vertical section of the upper part of FIG. 2 with the wire-feeding device or mechanism in a different angular position;

FIG. 4 is a view in vertical section taken on line 4—4 of FIG. 1 looking in the direction of the arrows;

FIG. 5 is an enlarged section taken on line 5—5 of FIG. 4 showing a detail;

FIGS. 6–11 illustrate the addition to the apparatus of a positively driven feed roll which draws the wire strands from the supply reels and feeds them into the lower ends of the guide tubes.

FIG. 6 is an enlarged fragmentary elevation of the lower right-hand portion of FIG. 1;

FIG. 7 is an end view of FIG. 6 looking from the left as indicated by arrow on line 7—7;

FIG. 8 is a central section of a portion of the feed roll taken on line 8—8 of FIG. 6;

FIG. 9 is a vertical cross section of the feed roll taken on line 9—9 of FIG. 8;

FIG. 10 is a view similar to FIG. 9 but with the strand in a different position; and FIG. 11 is an enlarged fragmentary vertical section of the feed roll showing two adjacent grooves.

DESCRIPTION OF THE PREFERRED EMBODIMENT

Figure 1:
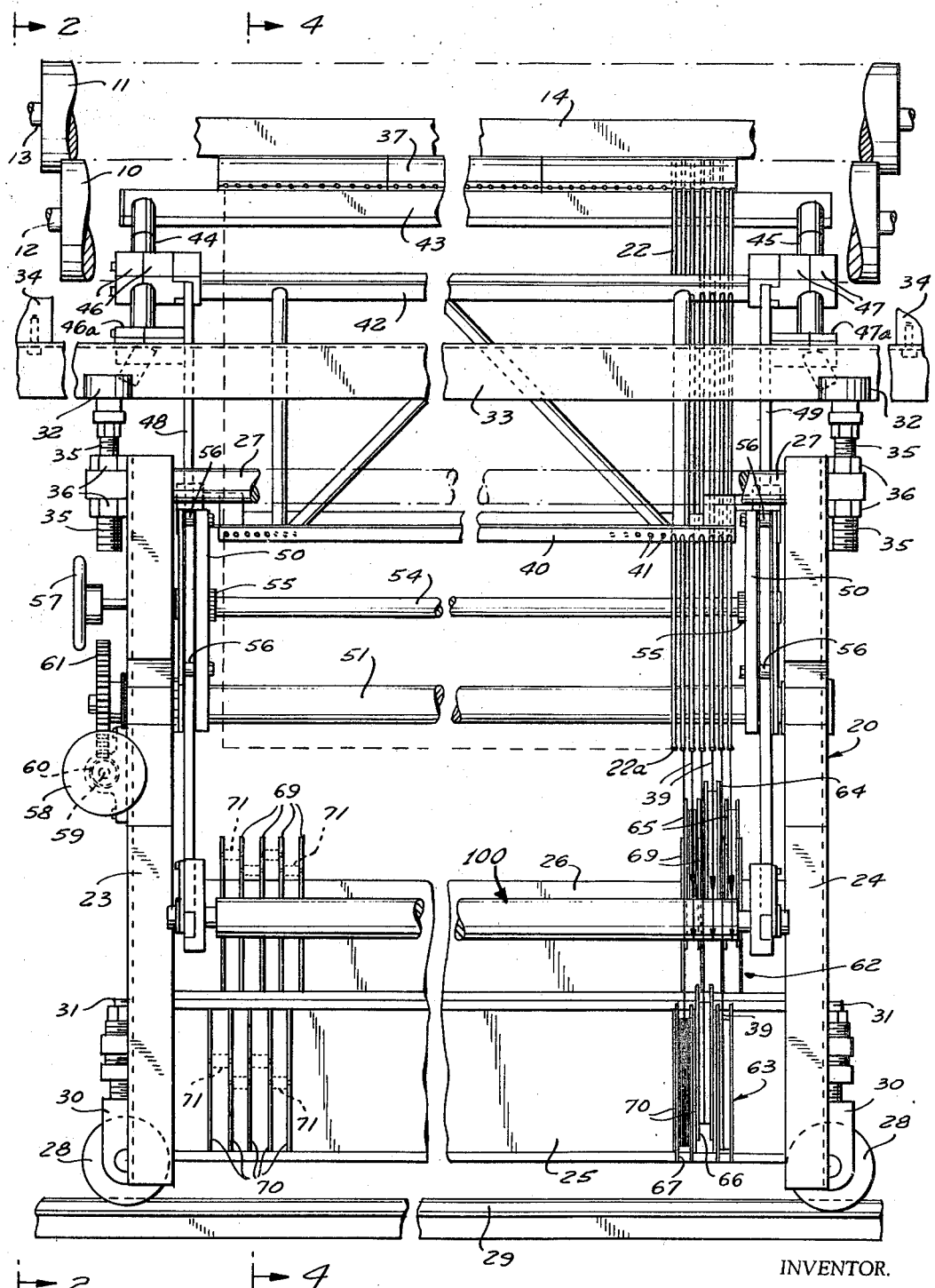
FIG. 1 is a view of the apparatus in front elevation.
Figure 6:
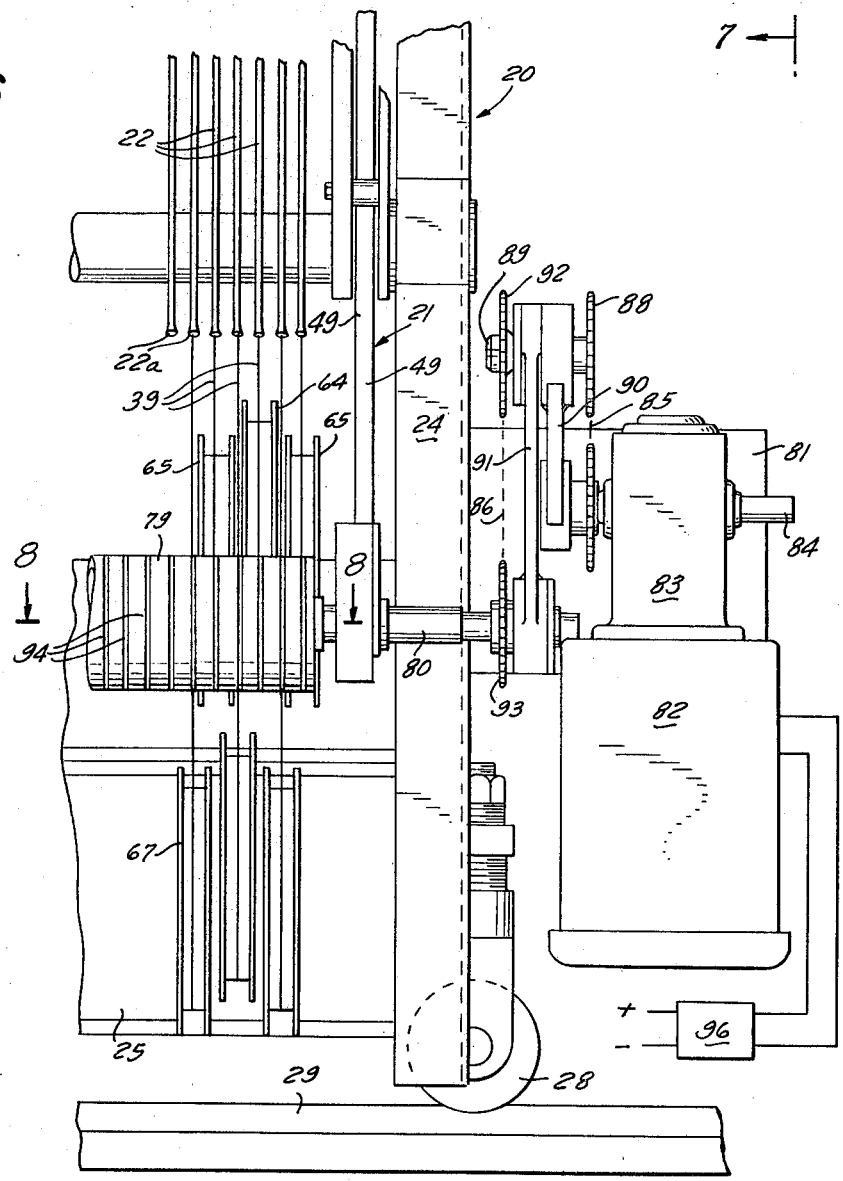
Figure 8:
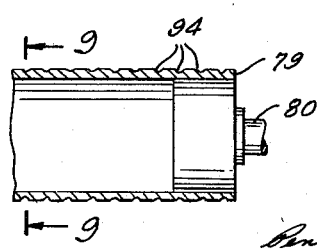

Referring now to these drawings, the wired glass-making apparatus includes lower and upper forming rolls 10 and 11, which determine the thickness, the width, and the rate of production of the glass sheet. These rolls are of conventional construction and rotate on shafts 12 and 13 respectively which are power driven in a conventional manner, and the surface speed of which can be regulated according to well known practice. The distance between the surfaces of rolls 10 and 11 can be adjusted to produce the thickness of glass sheet desired.

To the right of rolls 10 and 11 there is a forehearth 14 of ceramic or other suitable material which has a forward rounded end 15 terminating in a lip block 16 over which molten glass 17 from a suitable furnace (not shown) is fed. As shown in FIGS. 2 and 3 the axis of the upper roll 11 is located downstream from the axis of the lower roll 10. As the molten glass moves over the lip block 16 to forming rolls 10 and 11, the glass is formed into a mass 18 which, as shown in FIGS. 2 and 3, has a horizontally to the underside of the molten glass mas diameter of the lower roll 10. This mass of glass has an apron 19 below the end of lip block 16.

The apparatus for feeding the separate individual wires horizontally to the under side of the molten glass mass and specifically to the apron 19, comprises a main frame 20 and a carrier or carrier frame 21 for supporting a series of small gage tubes 22 each carrying one of the wires which are to be imbedded in the glass.

Main frame 20 comprises two upright channel members 23 and 24 which are parallel to one another and spaced apart a distance somewhat greater than the width of the wired glass sheet which is to be formed. These channel members are secured to one another near their lower ends by a cross channel member 25 and an angle member 26 which rests upon the upper flange of channel member 25. These cross members are welded to the side channel members 23 and 24 at their ends.

Side members 23 and 24 are tied together near their upper ends by means of a cross member 27 (either a rod as shown, or a tube), the central portion of which is broken away in FIG. 1 for the sake of clarity. Main frame 20 may be supported for lateral adjusting movement with respect to forming rolls 10 and 11 by means of grooved wheels 28 resting on a horizontal rail 29. Wheels 28 are mounted each in a fitting 30 which is provided with a threaded upper rod 31 by which it is secured to one of the upright channel members 23 or 24 for vertical adjustment so that the entire main frame 20 can be adjusted vertically with respect to the forming rolls 10 and 11.

The top of main frame 20 is supported laterally to prevent rocking movement about rail 29 by means of two pairs of rollers 32, one pair on each side of frame 20, which engage the opposite sides of a fixed vertical rail 33 which may be in the form of an angle member mounted upon any convenient fixed support 34. The pairs of rollers 32 are also arranged for any required vertical adjustment by means of threaded supporting rods 35 and clamping nuts 36.

The tubes 22 are arranged side by side on ½ inch centers on the carrier frame 21, the number of tubes depending upon the width of the wired glass sheet which is to be produced. Thus for example, if such sheet is 60 inches wide a total of 120 tubes 22 will be required. A wire feed block 37 serves to support these tubes at their upper ends and extends the full width of the glass sheet. Such feed block is conveniently made in a plurality of segments or sections joined end-to-end as indicated in FIG. 1. Although shown in FIG. 4 in section as being made in one piece, it is convenient to make each section in two parts secured together with screws. The upper ends of the individual tubes 22 are inserted in apertures in wire feed block 37 and secured therein by means of a force fit, or otherwise. The upper end portions of the respective apertures 38 in this block are curved towards the left (FIG. 4) to change the direction of feed of the wires in the direction of apron 19. The upper end of feed block 37 is tapered as shown in FIG. 4 to form a narrow nose in side view which will permit the wires to be delivered close to the bottom of lip block 16 which, as shown in FIGS. 2 and 3, has a flat lower surface parallel with the upper surface of forehearth 14.

Tubes 22 are of some considerable length and extend towards the lower end of carrier 21 as shown in FIG. 4. Their lower ends are bell-shaped as indicated at 22a to facilitate the threading and entrance of the several wires or strands 39. Tubes 22 are supported at several places throughout their length as shown in this figure and in FIG. 1. One of these supports is an angle bar 40 which is apertured as indicated at 41 to receive the tubes. Another similar support is a second angle bar 42 which like bar 40 extends crosswise of the carrier frame 21.

The wire feed block 37 at the upper ends of tubes 22 is mounted on a wire guide support 43 which is a hollow member extending crosswise of the apparatus and secured near its opposite ends to supporting pipes 44 and 45 respectively. Wire guide support 43 is supplied with cooling water through its pipe supports 44 and 45 to reduce warpage of the tubes 22. Pipes 44 and 45 are mounted for sliding adjustment in bolted clamping blocks 46 and 47 and 46a, 47a which form a part of the carrier frame 21 at its upper end. By this construction the location of wire feed block 37 can be adjusted lengthwise of carrier frame 21 to meet various arrangements of the wire feeding apparatus with respect to the glass forming rolls 10 and 11.

Carrier frame 21 comprises two side bar members 48 and 49 which are tied together by the cross members 42 and 40. Carrier 21 is mounted for both lengthwise movement and pivotal movement with respect to main frame 20. This mounting is accomplished by means of a special bracket member 50 at each side of the carrier frame. These bracket members 50 are of general trapezoidal shape in side view as shown in FIG. 4 and are keyed to a cross shaft 51 which is mounted for rotation in any suitable manner in the side members 23 and 24 of the main frame.

Bracket members 50 have lengthwise slots 52 (FIG. 5) to receive the respective side bars 48 and 49. The inner edges of these bars are provided with rack teeth 53 in the vicinity of a rotary cross-shaft 54 on which a pinion 55 is mounted to engage these teeth. The rack and pinion teeth are held in engagement by means of small rollers 56 which bear against the outer surfaces of the respective side bars 48 and 49. The carrier frame 21 is adjusted lengthwise by turning a handwheel 57 (FIG. 1) mounted on one end of rotary shaft 54.

To adjust carrier frame 21 angularly with respect to main frame 20 and with respect to the glass forming apparatus, a second handwheel 58 is arranged to turn a worm shaft 59 and a worm 60 which engages a worm gear 61 which is fixed to one end of shaft 51.

The supplying of individual wires or strands 39 to the lower or bell-shaped ends 22a of tubes 22 presents something of a problem, and is accomplished by providing an individual wire reel for each of the tubes and by arranging in staggered relation in different banks, each two reels which supply adjacent tubes. For apparatus which feeds wires on ½ inch spacing to a glass sheet 60 inches in width, it is necessary to mount 120 of these reels in position properly to feed the wires to each of the tubes.

As shown in the drawings, lower and upper banks 62 and 63 of these reels are provided and each bank consists of two sets of reels of uniform size, namely alternate reels 64 and intermediate reels 65 in the upper bank, and alternate reels 66 and intermediate reels 67 in the lower bank. Reels 64 and 65 of the upper bank are disposed between parallel steel plates 69 which are spaced apart slightly more than the thickness of the reels and are welded to angle member 26. Reels 66 and 67 of the lower bank are placed between similarly spaced steel plates 70 which are welded to channel member 25.

The reels are supported for rotation by means of short individual shafts 71. Each of those short shafts has a short journal bearing of reduced diameter at each end thereof. These journal bearings are received in vertically spaced angular slots 72 and 73 in plates 69 for the upper bank, and in slots 74 and 75 in plates 70 for the lower bank. The alternate reels 64 of the upper bank are journaled in the upper slots 72 and the intermediate reels 65 in lower slots 73. Similarly with the lower bank, the alternate reels 66 are supported in the upper slots 74, and the intermediate reels 67 in lower slots 75.

In this way, the adjacent reels of each bank are supported in staggered relation to one another. Wires 39 feeding to adjacent tubes 22 are taken from two vertically overlapping reels one from the upper bank and one from the lower. Thus reels of substantial thickness and containing a large amount of wire can be used and still feed the wires to the closely spaced wire guide tubes 22. All of wire strands 39 in traveling from the respective reels to the guide tubes 22 pass over a guide roll 100 mounted at the lower end of carrier 21.

Advantageously the wires are fed towards tubes 22 by a positively driven grooved feed roll 79 shown in FIGS. 6–11. Roll 79 is rotatably mounted at the lower end of carrier frame 21 in place of roll 100 shown in FIGS. 1, 2 and 4. The left end of roll 79 is provided with a short supporting shaft (not shown) which is mounted for rotation at the lower end of side member 48 of carrier 21, and the guide roll is supported at its right end by a shaft 80 which rotates in a bearing mounted at the lower end of side member 49 of carrier 21.

Fixed on the outer surface of channel 24 at the right of main frame 20 is a vertical plate support 81 and mounted on this support is a combined speed reducing gearing 83 and an electric motor 82 which serves to drive fed roll 79. Shaft 80 of the fed roll 79 is driven by the output shaft 84 of the reducing gearing 83 through endless chains 85 and 86. Chain 85 operates around a driving sprocket 87 on shaft 84 and also around a sprocket 88 which is fixed to a short shaft 89 supported in bearings at the outer ends of two angular arms 90 and 91.

The inner end of arm 90 is supported for angular movement on shaft 84 and the inner end of shaft 91 is similarly supported on shaft 80. On the inner end of short shaft 89 there is a sprocket 92 similar to sprocket 88 and on shaft 80 is a similar sprocket 93 which serves to drive the grooved feed roll 79.

The feed roll withdraws the individual strands from their respective supply reels 64–67 and feeds these strands into the lower ends 22a of the guide tubes 22. There are as many grooves 94 in feed roll 79 as there are wire strands 39, and each strand is wound in at least one complete turn around the feed roll. This is shown in FIGS. 9, 10 and 11. A wire or strand 39 approaches the grooved feed roll 79 from below and passing completely around the feed roll moves upwardly to one of the guide tubes 22.

The wire usually is pulled easily from its reel and the rotational speed of motor 82 is adjusted to cause the feed roll to withdraw the wires from the reels at a speed which is slightly higher than the speed at which the wires are drawn through the tubes 22 and into the molten glass by the forming rolls 10 and 11. Consequently a loop, such as indicated at 95 in FIG. 9, is formed. However, should the strand or wire encounter excessive resistance in being withdrawn from its reel, the loop will tighten against the surface of the feed roll as indicated in FIGS. 10 and 11 and thus prevent any slackening in the speed of the wires as they enter the molten glass.

The speed of motor 82 is regulated by a controller 96 of conventional construction.

Advantageously the grooves 94 are shaped approximately as shown in FIG. 11 so that the wire 39 as it leaves the groove will be in contact with a surface of the groove which has a slightly smaller diameter than the wire as it approaches the groove.

In operating the apparatus, wires 39 are passed through the multiplicity of tubes 22 and their ends carried above the elongated wire feed block 37 which extends the full width of the glass sheet to be formed by rolls 10 and 11. These ends are tied to a "bait" wire 76 which is stretched along the tip or nose of wire feed block 37. Then molten glass is fed to rolls 10 and 11 and the rolls adjusted and operated until good quality of sheet is obtained having a thickness, for example, of 7/32 of an inch. The carrier frame 21 is then inclined to a suitable angle, usually about 30° as shown in FIG. 3, in the direction of glass travel and moved forward until bait wire 76 is seized by the bottom surface of the moving stream of glass at apron 19.

The position of wire feed block 37 with reference to lip block 16 of the forehearth can then be adjusted and, together with the vertical and lateral adjustments of forming rolls 10 and 11, provided on the glass rolling machine, serve to provide the optimum centering of the wires 39 in the glass sheet 77 so as to maintain the straightness and parallelism of the individual wires. The glass sheet 77 with the wires imbedded therein at the proper depth and at uniform spacing, is processed through a conventional lehr (not shown) to which it is carried by the series of rolls 78 and where it is cooled and thereafter cut to the desired dimensions.

The adjustment of the position of wire feed block 37 referred to in the previous paragraph involves both the vertical and angular adjustment of carrier 21. The drive of feed roll 79 from the stationary shaft 84 of the speed reducing gearing through the two chains 85 and 86 and their associated pivoted angular arms 90 and 91 permits the described adjustment of carrier 21.

I claim:
1. A machine for making wired glass comprising upper and lower cooperating rolls rotating on horizontal, parallel axes, the axis of the upper roll being located downstream from the axis of the lower roll, a forehearth having a horizontal upper surface and a flat, parallel lower surface, means for delivering molten glass over the upper surface of the forehearth to the forming rolls, means for feeding parallel unjoined wire strands into the molten glass immediately below the flat, horizontal lower surface of the forehearth and in a direction generally parallel therewith, the forehearth upper surface being disposed at about the level of the axis of the upper roll, the end of the forehearth and the entrance of the wire strands into the molten glass being disposed in advance of the upper roll by approximately one half the diameter of the lower roll and approximately vertically above the side of the lower roll so that said wires are not subjected to intense heat.

2. A machine for making wired glass as set forth in claim 1 wherein the wire feeding means includes a carrier for supporting a series of guide tubes at an elevation lower than the forming rolls and forehearth and at right angles to the forming rolls and arranged in parallel relation in a row extending lengthwise of the forming rolls, means of supplying wire strands to the lower ends of the respective guide tubes, a stationary frame, said carrier being pivotally mounted on said frame, and means for adjusting said carrier angularly, vertically and laterally to cause the upper ends of said tubes to deliver the unjoined wire strands into the molten glass mass beneath said forehearth.

3. A machine for making wired glass as set forth in claim 2 in which the means for supplying wire strands to the respective guide tubes includes a supply reel and positively driven feed roll means for each wire strand for withdrawing the wires from the supply reels and delivering them to the respective guide tubes, said feed roll means being rotatively mounted on said carrier.

4. A machine for making wired glass as set forth in claim 2 wherein the drive for the feed roll comprises a power driven mechanism mounted in stationary position on said stationary frame, and a double chain drive between the output shaft of said mechanism and the shaft of said feed roll, said chains respectively being trained around sprockets mounted on a common shaft which serves to pivotally interconnect the outer ends of two equal length arms, the opposite end of one of said arms being pivoted on the output shaft of said mechanism and the corresponding end of the second arm being pivoted on the shaft of said feed roll.

5. A machine for making wired glass as set forth in claim 3 in which the individual wires from the respective supply reels are each wound at least one turn around the feed roll.

6. A machine for making wired glass as set forth in claim 5 wherein the feed roll is grooved, one groove being provided for the wire from each of the supply reels.

References Cited

UNITED STATES PATENTS

| | | | |
|---|---|---|---|
| 1,960,315 | 5/1934 | Paxton et al. | 65—51 |
| 2,291,549 | 7/1942 | Gutmann | 65—148 |
| 3,207,597 | 9/1965 | Pfluger | 65—148 |

ARTHUR D. KELLOGG, Primary Examiner

U.S. Cl. X.R.

65—101

PO-1050
(5/69)

UNITED STATES PATENT OFFICE
CERTIFICATE OF CORRECTION

Patent No. 3,505,052                          Dated April 7, 1070

Inventor(s) Herman E. Goddard

It is certified that error appears in the above-identified patent and that said Letters Patent are hereby corrected as shown below:

| Column | Line | Reads | Should Read |
|--------|------|-------|-------------|
| 3 | 43 | horizontally | horizontal |
| 3 | 43 | to the underside of the molten glass mas | thickness that is approximately one half the |
| 8 | 23 | 3,207,597 | 3,207,591 |

SIGNED AND SEALED
AUG 11 1970

(SEAL)
Attest:

Edward M. Fletcher, Jr.
Attesting Officer

WILLIAM E. SCHUYLER, JR.
Commissioner of Patents